United States Patent [19]

Gulotta et al.

[11] Patent Number: 5,393,593
[45] Date of Patent: Feb. 28, 1995

[54] DARK GRAY, INFRARED ABSORBING GLASS COMPOSITION AND COATED GLASS FOR PRIVACY GLAZING

[75] Inventors: Joseph A. Gulotta, New Kensington; John F. Krumwiede, Cheswick; Luke A. Kutilek, Oakmont; Anthony V. Longobardo, Butler; Robert B. Heithoff, Gibsonia, all of Pa.

[73] Assignee: PPG Industries, Inc., Pittsburgh, Pa.

[21] Appl. No.: 133,949

[22] Filed: Oct. 12, 1993

Related U.S. Application Data

[63] Continuation-in-part of Ser. No. 70,821, Jun. 3, 1993, abandoned, which is a continuation-in-part of Ser. No. 762,516, Sep. 18, 1991, abandoned, which is a continuation-in-part of Ser. No. 678,398, Apr. 1, 1991, abandoned, and a continuation-in-part of Ser. No. 644,051, Jan. 22, 1991, abandoned, which is a continuation-in-part of Ser. No. 603,599, Oct. 25, 1990, abandoned.

[51] Int. Cl.⁶ .............................................. B32B 17/06
[52] U.S. Cl. ..................................... 428/220; 428/426; 428/428; 428/432; 428/702; 428/212; 501/71; 501/904; 501/905
[58] Field of Search ............... 428/926, 428, 432, 212, 428/702; 501/71, 904, 905

[56] References Cited

U.S. PATENT DOCUMENTS

| | | | |
|---|---|---|---|
| Re. 25,312 | 1/1963 | Duncan et al. | 106/52 |
| 2,524,719 | 10/1950 | Tillyer | 106/52 |
| 2,688,565 | 9/1954 | Raymond | 117/35 |
| 2,860,059 | 11/1958 | Molter et al. | 106/52 |
| 2,892,726 | 6/1959 | Smith et al. | 106/52 |
| 3,294,556 | 12/1966 | Harrington | 106/52 |

(List continued on next page.)

FOREIGN PATENT DOCUMENTS

| | | |
|---|---|---|
| 596334 | 4/1990 | Australia . |
| 735187 | 5/1966 | Canada . |
| 0297404 | 1/1989 | European Pat. Off. . |
| 0452207 | 4/1991 | European Pat. Off. . |
| 2270215 | 4/1975 | France . |
| 2331527 | 10/1975 | France . |
| 2682101 | 4/1993 | France . |
| 1331492 | 9/1973 | United Kingdom . |
| 91/07356 | 5/1991 | WIPO . |
| 91/11402 | 8/1991 | WIPO . |

OTHER PUBLICATIONS

"Glass Colors, V, Examples of the Composition of Colored Glasses", Kocik et al., Fachberichte, Sprechsaal, vol. 121, No. 1, 1988, 42–44.
Patent Abstracts of Japan, vol. 6, No. 197, 6 Oct. 1982, JP-57 106 537.

*Primary Examiner*—Ellis P. Robinson
*Assistant Examiner*—Timothy M. Speer
*Attorney, Agent, or Firm*—Andrew C. Siminerio

[57] ABSTRACT

A neutral, dark gray, soda-lime-silica glass having luminous transmittance less than 35 percent, infrared transmittance less than 20 percent, and total solar energy transmittance less than 22 percent (all at 3.9 millimeter thickness) is produced with colorants consisting essentially of 1.0 to 2.2 percent by weight total iron, at least 0.20 percent FeO, 0.01 to 0.03 percent CoO, and 0.0005 to 0.005 percent Se. The flat glass product having such a composition is particularly suitable for use as privacy glazing. The use of the glass as a substrate for a reflectively coated product is also disclosed. A low transmittance, reflective coated article is disclosed comprising a soda-lime-silica glass substrate having luminous transmittance less than 35 percent, infrared transmittance less than 20 percent, and total solar energy transmittance less than 22 percent (all at 3.9 millimeter thickness) and a metal oxide coating having a luminous reflectance not more than 25 percent from the coated surface, and not more than 8 percent from the uncoated surface. The low transmittance coated glass product is particularly suitable for use as privacy glazing.

47 Claims, No Drawings

U.S. PATENT DOCUMENTS

| | | | |
|---|---|---|---|
| 3,296,004 | 1/1967 | Duncan | 106/52 |
| 3,300,323 | 1/1967 | Plumat et al. | 106/52 |
| 3,411,934 | 11/1968 | Englehart et al. | 117/33.3 |
| 3,498,806 | 3/1970 | Hammer et al. | 106/52 |
| 3,660,061 | 5/1972 | Donley et al. | 65/32 |
| 3,723,142 | 3/1973 | Kato et al. | 106/52 |
| 4,104,076 | 8/1978 | Pons | 106/52 |
| 4,129,434 | 12/1978 | Plumat et al. | 65/60 |
| 4,190,452 | 2/1980 | Fischer et al. | 106/52 |
| 4,294,881 | 10/1981 | Meyer et al. | 428/334 |
| 4,308,319 | 12/1981 | Michelotti et al. | 428/432 |
| 4,336,303 | 6/1982 | Rittler | 428/334 |
| 4,521,454 | 6/1985 | Kandachi et al. | 427/168 |
| 4,617,206 | 10/1986 | Haisma et al. | 427/374.1 |
| 4,719,126 | 1/1988 | Henery | 427/165 |
| 4,719,127 | 1/1988 | Greenberg | 427/165 |
| 4,728,353 | 3/1988 | Thomas et al. | 65/60.1 |
| 4,792,536 | 12/1988 | Pecoraro et al. | 501/70 |
| 4,798,616 | 1/1989 | Knavish et al. | 65/135 |
| 4,873,206 | 10/1989 | Jones | 501/71 |
| 4,971,843 | 11/1990 | Michelotti et al. | 428/34 |
| 5,023,210 | 6/1991 | Krumwiede et al. | 501/71 |

DARK GRAY, INFRARED ABSORBING GLASS COMPOSITION AND COATED GLASS FOR PRIVACY GLAZING

This is a continuation-in-part application of U.S. patent application Ser. No. 08/070,821, filed Jun. 3, 1993, now abandoned, which is a continuation-in-part application of U.S. patent application Ser. No. 07/762,516, filed Sep. 18, 1991, now abandoned which in turn is a continuation-in-part application of U.S. patent application Ser. Nos. 07/678,398, filed Apr. 1, 1991, now abandoned, and 07/644,051, filed Jan. 22, 1991, now abandoned, which in turn is a continuation-in-part application of U.S. patent application Ser. No. 07/603,599, filed on Oct. 25, 1990, now abandoned.

BACKGROUND OF THE INVENTION

This invention involves a dark, neutral gray colored glass that has low luminous transmittance, particularly low infrared transmittance, and low total solar energy transmittance. Although not limited to a particular use, the glass of this invention exhibits a combination of properties that make it highly desirable for use for privacy glazing such as in the rear portions of vehicles such as vans. These properties include low visible light transmittance to reduce visibility of the contents of the vehicle, low infrared and total solar energy transmittance to reduce heat gain in the interior of the enclosure, a neutral gray color for the sake of coordinating with a wide range of interior and exterior finish colors, and a composition compatible with flat glass manufacturing methods. The glass of the present invention is particularly useful as a substrate for reflective coatings for privacy glazing applications. Therefore, another aspect of the invention is the product comprising the glass of the invention coated with a reflective coating.

The pyrolytic deposition of metal oxide films onto a glass surface is described in U.S. Pat. No. 3,660,061 to Donley et al., the disclosure of which is incorporated herein by reference. Organometallic salts, preferably acetylacetonates, are dissolved in an organic vehicle such as methylene chloride. The organic solution is sprayed onto a hot glass surface where it thermally decomposes to form a metal oxide film which alters the reflectance and transmittance of solar energy by the glass.

It is known from U.S. Pat. No. 2,688,565 to Raymond that light reflecting coatings of cobalt oxide may be deposited by contacting a hot glass surface with an aqueous solution of cobalt acetate. However, such films have a grainy, irregular texture and are highly porous, resulting in poor acid resistance evidenced by debonding of the film.

U.S. Pat. No. 4,308,319 to Michelotti et al. discloses the pyrolytic deposition of a durable, uniform, solar energy reflecting spinel-type film from an aqueous solution of a water soluble cobalt salt and a water soluble tin compound.

U.S. Pat. No. 4,719,126 to Henery, the disclosure of which is incorporated herein by reference, discloses the pyrolytic deposition of light and heat reflective metal oxide films, having similar spectral, physical and chemical properties in comparison with films pyrolytically deposited from organic solutions, from an aqueous suspension wherein organometallic coating reactants typically used in organic solutions are physically suspended in an aqueous medium by means of vigorous and continuous mixing. The organometallic coating reactants physically suspended in an aqueous medium may be pyrolytically deposited to form metal oxide films on a hot glass substrate using conventional spray equipment and under temperature and atmosphere conditions generally encountered in pyrolytic coating operations.

U.S. Pat. No. 4,719,127 to Greenberg, the disclosure of which is incorporated herein by reference, discloses films pyrolytically deposited from an aqueous suspension wherein organometallic coating reactants typically used in organic solutions are chemically suspended in an aqueous medium by use of a chemical wetting agent in combination with extremely fine powder reactants. The organometallic coating reactants chemically suspended in an aqueous medium may be pyrolytically deposited to form metal oxide films on a hot glass substrate using conventional spray equipment, and under temperature and atmosphere conditions generally encountered in pyrolytic coating operations.

Various heat-absorbing glass substrates are known in the art. The primary colorant in the category of glasses relevant to the present invention is iron, which is usually present in both the $Fe_2O_3$ and $FeO$ forms. As is conventional, the total amount of iron present in a glass is expressed herein as $Fe_2O_3$, regardless of the form actually present. A typical green tinted automotive glass has about 0.5 percent by weight total iron, with the ratio of FeO to total iron being about 0.25.

A typical prior art dark gray glass composition is the following:

| | |
|---|---|
| $SiO_2$ | 72.90% by weight |
| $Na_2O$ | 13.70 |
| $K_2O$ | 0.03 |
| CaO | 8.95 |
| MgO | 3.90 |
| $Al_2O_3$ | 0.10 |
| $SO_3$ | 0.27 |
| $Fe_2O_3$ | 0.060 |
| CoO | 0.015 |
| NiO | 0.095 |

Infrared absorption of this type of glass is not as low as would be desired for the purposes of the present invention. Furthermore, inclusion of nickel is undesirable because the presence of nickel during the melting process sometimes leads to the formation of nickel sulfide stones in the glass. Although the nickel sulfide stones are nearly invisible and cause no harm to the glass under normal conditions, the high coefficient of thermal expansion of nickel sulfide can cause thermally induced stresses sufficient to fracture a tempered glass sheet having a nickel sulfide stone. Additional problems faced when using nickel include haze formation on the glass surface due to reduction of the nickel in the tin bath and change in the glass color when it is heat treated. A more recent, nickel-free version of commercial dark gray glass is disclosed in U.S. Pat. No. 5,023,210 to John F. Krumwiede et al. The colorants in that glass are iron oxide, cobalt oxide, selenium, and chromic oxide. The infrared absorption of that glass is not as low as would be desired, the disclosed examples having infrared transmittances ranging from 34 to 36 percent at a thickness of 5.56 millimeters.

Another nickel-containing gray glass composition is disclosed in U.S. Pat. No. Re. 25,312 (Duncan et al.). The luminous (visible) transmittances for the examples in that patent are higher than desired for privacy glazing.

Other prior art gray glasses containing iron oxide, cobalt oxide, and selenium (without nickel) are disclosed in U.S. Pat. No. 3,723,142 (Kato et al.) and British Patent Specification 1,331,492 (Bamford). In both of these patents the glass is more transparent than is considered suitable for the privacy glazing type of application to which the present invention is directed.

Another attempt at nickel-free gray glass is disclosed in U.S. Pat. No. 4,104,076 (Pons) where, instead of nickel, $Cr_2O_3$ or $UO_2$ are required in combination with iron oxide, cobalt oxide, and selenium. Although broad ranges for the coloring agents are disclosed in that patent, all of the examples have colorant concentrations that would not produce the particular combination of properties desired here. In particular, the teachings of that patent are not directed to production of dark gray glass for privacy glazing.

U.S. Pat. No. 3,300,323 (Plumat et al.) also involves an attempt to produce gray glass without nickel. Instead of nickel, this patent's approach requires the inclusion of $TiO_2$ and optionally $MnO_2$, both of which are preferably avoided for commercial production by the float process. Additionally, the objective of the patent is to produce relatively high transmittance glass that would not be suitable for privacy glazing.

Glasses having a color described as "rose-smoke" are produced by the teachings of U.S. Pat. Nos. 2,524,719 (Tillyer) and 2,892,726 (Smith et al.) using iron, cobalt, and selenium as the coloring agents. These glasses are not neutral gray, which is a requirement of the present invention for the sake of color coordination with a variety of vehicle colors and for the sake of avoiding undue color distortion of the view out of the vehicle. Additionally, these patents are directed to producing small quantities of glass for ophthalmic uses, not for mass production of flat glass.

The combination of iron, cobalt, and selenium is disclosed as the coloring agent for making bronze colored glass in U.S. Pat. No. 3,296,004 (Duncan).

U.S. Pat. No. 4,792,536 (Pecoraro et al.) discloses a blue colored glass in which redox conditions are controlled to provide enhanced amounts of iron in the ferrous state for the sake of improving infrared absorption.

It would be desirable to be able to make a dark, neutral gray glass with low transmittance, without troublesome constituents, and that is compatible with commercial flat glass manufacturing techniques. For privacy glazing, it would be particularly desirable for the glass to have very low infrared transmittance, which in turn would yield low total solar energy transmittance.

SUMMARY OF THE INVENTION

The present invention is a glass composition having a neutral dark gray color, relatively low luminous (visible) transmittance, and exceptionally low infrared and total solar energy transmittances. The glass of the present invention has a standard soda-lime-silica flat glass base composition and avoids constituents that may cause difficulty in manufacturing or in subsequent use of the product such as nickel, chromium, manganese, and titanium. It has been found that the low transmittances desired for privacy glazing can be attained in a neutral gray glass using only the usual colorants iron, cobalt, and selenium in the following ranges:

| Component | Weight Percent of Total Glass |
|---|---|
| $Fe_2O_3$ (total iron) | 1.00–2.2 |
| FeO | at least 0.20 |
| Se | 0.0005–0.005 |
| CoO | 0.010–0.030 |

At a thickness of 3.9 millimeters the glass of the present invention exhibits luminous transmittance (C.I.E. illuminant C) less than 35 percent, preferably less than 30 percent, total solar infrared transmittance less than 20 percent, preferably less than 13 percent, most preferably less than 10 percent, and total solar energy transmittance of less than 22%. Although not an essential requirement of the invention, the preferred embodiments exhibit total solar ultraviolet transmittance less than 20%. The FeO content of the glass is preferably at least 0.27 weight percent, and more preferably 0.28 to 0.50 weight percent.

Neutral gray coloration is marked by low excitation purity. The glass of the present invention generally exhibits excitation purity less than 5 percent. For certain applications, the color of the substrate may be required to deviate from the neutral gray to a blue-gray or, green-gray for example and the excitation purity would be as high as 15% or higher.

The dominant wavelength may vary somewhat in accordance with particular color preferences. Therefore, a particular dominant wavelength range is not an essential characteristic of the present invention, but it is considered a preference that the color of the glass of the present invention is blue-gray when the glass is used as a substrate for a bronze coating so that the coated product has an overall green-gray color. The blue-gray color is characterized by dominant wavelengths in the range of 485 to 510 nanometers, preferably 485 to 495 nanometers, and an excitation purity of no higher than 15%, preferably 12%. When the glass is to remain uncoated, it is preferred that the glass color be green-gray, characterized by dominant wavelengths in the range of 500 to 560 nanometers, preferably 510 to 550 nanometers, and an excitation purity of no higher than 10%, preferably less than 5%.

The present invention further encompasses combining a reflective metal oxide film, preferably deposited by pyrolysis, with a low transmittance glass substrate to form a low transmittance, reflective, heat-absorbing glass transparency particularly useful as privacy glazing in vehicles. The coated glass exhibits low luminous transmittance, particularly low infrared transmittance, and low total solar energy transmittance.

DETAILED DESCRIPTION

The base glass of the present invention, that is, the major constituents of the glass without colorants, is commercial soda-lime-silica glass characterized as follows:

| | Weight % |
|---|---|
| $SiO_2$ | 66–75 |
| $Na_2O$ | 10–20 |
| CaO | 5–15 |
| MgO | 0–5 |
| $Al_2O_3$ | 0–5 |
| $K_2O$ | 0–3 |
| BaO | 0–1 |

Melting and refining aids such as $SO_3$, fluorine, chlorine, and lithium compounds are sometimes used, and small amounts may be detected in this type of glass. To this base glass are added the coloring constituents of the present invention set forth above. The glass is essentially free of nickel; that is, no deliberate addition of nickel or nickel compounds is made, although the possibility of traces of nickel due to contamination may not always be avoided. Likewise, the glass is essentially free of colorants other than iron, cobalt, and selenium, and specifically it is essentially free of chromium, titanium, uranium, and manganese other than any trace amounts that may be present as impurities. Accordingly, the glass of the present invention may be melted and refined in a continuous, large-scale, commercial melting furnace and formed into flat glass sheets of varying thicknesses by the float method in which the molten glass is supported on a pool of molten metal, usually tin, as it assumes a ribbon shape and is cooled.

The total amount of iron present in the glass is expressed herein in terms of $Fe_2O_3$ in accordance with standard analytical practice, but that does not imply that all of the iron is actually in the form of $Fe_2O_3$. Likewise, the amount of iron in the ferrous state is reported as FeO, even though it may not actually be present in the glass as FeO. The proportion of the total iron in the ferrous state is used as a measure of the redox state of the glass and is expressed as the ratio $FeO/Fe_2O_3$, which is the weight percent of iron in the ferrous state (expressed as FeO) divided by the weight, percent of total iron (expressed as $Fe_2O_3$). Unless stated otherwise, the term $Fe_2O_3$ in this specification shall mean total iron expressed in terms of $Fe_2O_3$ and the term FeO shall mean iron in the ferrous state expressed in terms of FeO. Significant characteristics of the glass of the present invention are relatively high total iron concentration (above 1.0 weight percent) and FeO concentrations in the glass of at least 0.20 weight percent, in some cases at least 0.27 weight percent, and in the most preferred examples between 0.28 to 0.50 weight percent. High total iron reduces luminous transmittance, and high ferrous iron is particularly helpful in reducing infrared transmittance. Melting glass with large amounts of iron is difficult due to poor heat transfer. As a result, when total iron is greater than about 1.0 weight percent, generally additional melting enhancements must be provided to insure proper melting, e.g. bubbles and electrodes.

To avoid requiring unduly large amounts of total iron to meet the objectives of the present invention it is useful to enhance the proportion of iron in the ferrous state. Attaining the ferrous iron levels of the present invention requires controlling the redox conditions during melting so that conditions are relatively reducing. The redox ratio for the glass of the present invention may be maintained at about 0.2 to about 0.4, for example, when the total iron concentration is in the preferred concentrations (1.0, to 1.7 weight percent). A redox of 0.5 or higher can be attained by a process disclosed herein, but the use of higher redox ratios is preferably avoided to prevent excessive volatilization of selenium during melting. More specifically, in order for the selenium to be dissolved in the glass, it must be oxidized. A redox of 0.5 or higher presents a reducing condition that will inhibit selenium oxidation. However, it should be appreciated that the redox condition during melting may be controlled so that redox is initially at a lower level to promote oxidation of the selenium and its assimulation into the glass melt and subsequently increased to a higher value. Additionally, redox ratios above about 0.65 can result in unduly large amounts of amber coloration due to iron sulfide formations if sulfur is present in the glass. Redox control is achieved by means of controlling process conditions during the glassmaking process as described herein.

In the preferred embodiments of the present invention, for glass compositions having a redox of 0.30 or less, the total iron (in the form of $Fe_2O_3$) is preferably 1.3 weight percent or greater and more particularly for preferred compositions with a redox between 0.22 to 0.30, the total iron is preferably between 1.3 to 1.7 weight percent. For glass compositions having a redox of greater than 0.30, total iron is preferably less than 1.3 weight percent and more particularly for preferred compositions with a redox between 0.30 to 0.35, total iron is preferably between 1.0 to 1.3 weight percent.

The selenium colorant contributes a pink color to the glass as well as a brown color when complexed with iron to form iron selenide (FeSe), cobalt produces a blue color, and iron contributes yellow and blue in varying proportions depending upon the oxidation state. Iron in the ferric state ($Fe_2O_3$) yields a yellow color, and iron in the ferrous state (FeO) produces a blue color in transmittance. Relatively high concentrations of CoO in this glass help to produce low luminous transmittance. Selenium concentration is also relatively high and varies proportionally to the CoO and FeO concentrations in order to maintain a neutral color.

Inclusion of nickel has heretofore been considered essential for producing a neutral gray colored glass of this type because of its particular absorption spectrum. The absence of nickel and its absorption characteristics are accommodated in the present invention without addition of extraneous colorants by the combination of relatively high selenium and cobalt concentrations and low transmittance produced by relatively high iron concentrations. The effect is enhanced by the presence of substantial amounts of iron in the ferrous state which is believed to yield formation of ferrous selenide coloration sites in the glass.

The glass compositions disclosed in the present invention may be made using any of several types of melting arrangements, such as but not limited to, a conventional, overhead fired continuous melting operation as is well known in the art or a multi-stage melting operation as disclosed in U.S. Pat. No. 4,792,536 (Pecoraro et al.) However, for glass compositions having a redox of less than 0.30, the former operation is preferred and for glass compositions having a redox of 0.30 or greater, the latter operation is preferred.

Conventional, overhead fired continuous melting operations are characterized by depositing batch material onto a pool of molten glass maintained within a tank type melting furnace and applying thermal energy until the materials are melted into the pool of molten glass. The melting tanks conventionally contain a large volume of molten glass so as to provide sufficient residence time for currents in the molten glass to affect some degree of homogenization and fining before the glass is discharged into a forming operation. One such operation used for producing glass of the present invention incorporates a refiner and conditioner arrangement as disclosed in U.S. Pat. No. 4,798,616 to Knavish et al. In addition, the waist area includes a waist cooler and a pair of submerged coolers positioned upstream and downstream from a set of stirrers.

The glass melting and refining operation disclosed in U.S. Pat. No. 4,792,536 is characterized by separate stages whereby more flexibility in controlling redox conditions is provided. The overall melting process disclosed in that patent consists of three stages: a liquefaction stage, a dissolving stage, and a vacuum refining stage. Various arrangements could be employed to initiate the melting in the liquefaction stage, but a highly effective arrangement for isolating this stage of the process and carrying it out economically is that disclosed in U.S. Pat. No. 4,381,934 which is hereby incorporated by reference for details of the preferred liquefaction stage embodiment. The basic structure of the liquefaction vessel is a drum which may be fabricated of steel and has a generally cylindrical sidewall portion, a generally open top, and a bottom portion that is closed except for a drain outlet. The drum is mounted for rotation about a substantially vertical axis. A substantially enclosed cavity is formed within the drum by means of a lid structure.

Heat for liquefying the batch material may be provided by one or more burners extending through the lid. Preferably, a plurality of burners are arranged around the perimeter of the lid so as to direct their flames toward a wide area of the material within the drum. The burners are preferably water cooled to protect them from the harsh environment within the vessel.

Batch materials, preferably in a pulverulent state, may be fed into the cavity of the liquefying vessel by means of a chute. A layer of the batch material is retained on the interior walls of the drum aided by the rotation of the drum and serves as insulating lining. As batch material on the surface of the lining is exposed to the heat within the cavity, liquefied material flows down the sloped lining to a central drain opening at the bottom of the vessel. A stream of liquefied material falls freely from the liquefaction vessel through an opening leading to the second stage.

In order to provide reducing conditions for the purposes of the present invention the burner or burners in the liquefying stage may be operated with an excess amount of fuel relative to the amount of oxygen being supplied to each burner. For example, a ratio of 1.9 parts by volume oxygen to one part by volume natural gas has been found satisfactory for effecting the desired reduction levels in the glass. Alternatively, reducing conditions may be enhanced in the liquefaction stage by including a reducing agent such as coal or graphite in the batch mixture being fed to that stage.

The second stage of the specific embodiment being described may be termed the dissolving vessel because one of its functions is to complete the dissolution of any unmelted grains of batch material remaining in the liquefied stream leaving the liquefaction vessel. The liquefied material at that point is typically only partially melted, including unmelted sand grains and a substantial gaseous phase. In a typical soda-lime-silica melting process using carbonate batch materials,the gaseous phase is chiefly comprised of carbon oxides. Nitrogen may also be present from entrapped air.

The dissolving vessel serves the function of completing the dissolution of unmelted particles in the liquefied material coming from the first stage by providing residence time at a location isolated from the downstream refining stage. Soda-lime-silica glass batch typically liquefies at a temperature of about 2200° F. (1200° C.) and enters the dissolving vessel a temperature of about 2200° F. (1200° C.) to about 2500° F. (1376° C.), at which temperature residual unmelted particles usually become dissolved when provided with sufficient residence time. The dissolving vessel may be in the form of a horizontally elongated refractory basin with the inlet and outlet at opposite ends thereof so as to assure adequate residence time.

Although the addition of substantial thermal energy is not necessary to perform the dissolving step, heating can expedite the process and thus reduce the size of the dissolving vessel. More significantly, however, it is preferred to heat the material in the dissolving stage so as to raise its temperature in preparation for the refining stage to follow. Maximizing the temperature for refining is advantageous for the sake of reducing glass viscosity and increasing vapor pressure of included gases. Typically a temperature of about 2800° F. (1520° C.) is considered desirable for refining soda-lime-silica glass, but when vacuum is employed to assist refining, lower peak refining temperatures may be used without sacrificing product quality. The amount by which temperatures can be reduced depends upon the degree of vacuum. Therefore, when refining is to be performed under vacuum in accordance with the preferred embodiment, the glass temperature need be raised to no more than 2700° F. (1480° C.), for example, and optionally no more than 2600° F. (1430° C.) prior to refining. When the lower range of pressures disclosed herein are used, the temperature in the refining vessel need be no higher than 2500° F. (1370° C.) in some cases. Peak temperature reductions on this order result in significantly longer life for refractory vessels as well as energy savings. The liquefied material entering the dissolving vessel need be heated only moderately to prepare the molten material for refining. Combustion heat sources may be used in the dissolving stage, but it has been found that this stage lends itself well to electric heating, whereby a plurality of electrodes may be provided. Heat is generated by the resistance of the melt itself to electric current passing between electrodes in the technique conventionally employed to electrically melt glass. The electrodes may be carbon or molybdenum of a type well known to those of skill in the art.

The refining stage preferably consists of a vertically upright vessel that may be generally cylindrical in configuration having an interior ceramic refractory lining shrouded in a gas-tight, water-cooled casing. The structure and process of the preferred vacuum refining stage are those described in U.S. Pat. No. 4,738,938 (Kunkle et al.). A valve fitted to an inlet tube may be used to control the rate at which the molten material enters the vacuum refining vessel. As the molten material passes through the tube and encounters the reduced pressure within the refining vessel, gases included in the melt expand in volume, creating a foam. As foam collapses it is incorporated into the liquid body held in the refining vessel. Distributing the molten material as thin membranes of a foam greatly increases the surface area exposed to the reduced pressure. Therefore, maximizing the foaming effect is preferred. It is also preferred that the foam be exposed to the lowest pressures in the system, which are encountered at the top of the vessel in the headspace above the liquid, and therefore exposure is improved by permitting newly introduced, foamed material to fall through the head space onto the top of the foam layer. Refined molten material may be drained from the bottom of the refining vessel by way of a drain tube of a refractory metal such as platinum. The benefits of vacuum on the refining process are attained by degrees; the lower the pressure, the greater the benefit. Small reductions in pressure below atmospheric may yield measurable improvements, but to economically justify the vacuum chamber, the use of substantially reduced pressures are preferred. Thus, a pressure of no more than one-half atmosphere is preferred for the appreciable refining improvements imparted to soda-lime-silica flat glass. Significantly greater removal of gases is achieved at pressures of one-third atmosphere or less. More specifically, a refining pressure below 100 torr, for example 20 to 50 torr, is preferred to yield commercial float glass quality of about one seed per 1,000–10,000 cubic centimeters. Seeds less than 0.01 millimeter in diameter are considered imperceptible and are not included in the seed counts. A refining pressure of about 100 to 200 torr, and preferably 100 to 120 torr, is preferred to produce selenium containing float glass as taught in U.S. Pat. No. 4,886,539 (Cerutti et al.).

Typically, flat glass batch includes sodium sulfate as a melting and refining aid in the amounts of about 5 to 15 parts by weight per 1000 parts by weight of the silica source material (sand), with about 10 parts by weight considered desirable to assure adequate refining. When operating in accordance to U.S. Pat. No. 4,792,536, however, it has been found preferable to restrict the sodium sulfate to two parts by weight, and yet it has been found that refining is not detrimentally affected. Most preferably, the sodium sulfate is utilized at no more than one part per 1000 parts sand, with one-half part being a particularly advantageous example. These weight ratios have been given for sodium sulfate, but it should be apparent that they can be converted to other sulfur sources by molecular weight ratios. Complete elimination of refining aids is feasible using this process, although trace amounts of sulfur are typically present in other batch materials and colorants so that small amounts of sulfur may be present even if no deliberate inclusion of sulfur is made in the batch. Moreover, the vacuum treatment has been found to reduce the concentration of volatile gaseous components, particularly the refining aids such as sulfur, to levels lower than the equilibrium levels attained with conventional processes. Soda-lime-silica glass products, particularly flat glass products, that are mass-produced by conventional continuous melting processes are characterized by significant amounts of residual refining aids. In such products, the residual sulfur content (expressed as $SO_3$) is typically on the order of 0.2% by weight and seldom less than 0.1%. Even when no deliberate addition of sulfur refining aid is made to the batch, at least 0.02% $SO_3$ is usually detected in a soda-lime-silica glass made in a conventional continuous melter. In distinction thereto, soda-lime-silica glass made in accordance with U.S. Pat. No. 4,792,536 can be produced continuously by the embodiment disclosed herein with less than 0.02% residual $SO_3$, even when relatively small amounts of sulfur refining aid are being included in the batch as described above, and less than 0.01% $SO_3$ when no deliberate inclusion of sulfur is being made. At the lowest pressures, with no deliberate sulfur addition, $SO_3$ contents less than 0.005% are attainable. Although low levels of $SO_3$ are not essential for the present invention, low concentrations of $SO_3$ are an advantage under the most reduced redox conditions for the sake of avoiding formation of substantial amounts of ferric sulfide complex, which contributes an amber coloration to the glass. Traces of amber coloration may be tolerable in some examples of the present invention, but in general it is undesirable because it detracts from the purity of the desired color.

A stirring arrangement may be employed to homogenize the glass after it has been refined in order to produce glass of the highest optical quality. A particular embodiment may include a stirring chamber below the refining vessel within which a stream of glass is received from the refining vessel. The glass is preferably above 2200° F. (1200° C.,) during stirring. For purposes of the present invention the stirring arrangement is not limited to any particular structure of stirrer, any of the various mechanical devices that have been proposed for stirring molten glass in the prior art being usable. Some arrangements may be more effective than others in homogenizing the glass, but the number of stirrers and their speed of rotation can be selected to compensate for variations in efficiency. A particular example of a suitable stirrer structure is that disclosed in U.S. Pat. No. 4,744,809 (Pecoraro et al.). An optional feature, preferred for making higher quality flat glass, is that the stirring chamber may be integrated with a float forming chamber, whereby the glass in the stirring chamber rests on a layer of molten metal. The molten metal may be continuous with the molten metal constituting the support in the forming chamber, and is usually comprised essentially of tin. It has been found that the contact with molten metal in the stirring chamber tends to have a reducing effect on the glass, which is advantageous for attaining the redox conditions of the present invention.

Although not limited thereto, the glass of the present invention will most commonly be embodied by a flat sheet suitable for glazing windows of buildings or vehicles. Usually the sheet form will be made by the float process. A sheet of glass that has been formed by the float process (i.e., floated on molten tin) is characterized by measurable amounts of tin oxide that have migrated into surface portions of the glass on at least one side. Typically a piece of float glass has an $SnO_2$ concentration of at least 0.05% by weight in the first few microns below the surface that was in contact with the tin.

The transmittance data provided throughout this disclosure is based on a glass thickness of 3.9 millimeters (0.154 inch). Luminous transmittance ($LT_A$ and $LT_C$) is measured using C.I.E. 1931 standard illuminant "A" and "C" over the wavelength range 380 to 700 nanometers at 10 nanometer intervals. Total solar ultraviolet transmittance (TSUV) is measured over the wavelength range 300 to 390 nanometers at 10 nanometer intervals. Total solar infrared transmittance (TSIR) is measured over the wavelength range 800 to 2100 nanometers at 50 nanometer intervals. Total solar energy transmittance (TSET) represents a computed value based on measured transmittances from 300 to 2100 nanometers at 50 nanometer intervals. All solar transmittance data is calculated using Parry Moon air mass 2.0 solar data.

To determine this transmittance data, the transmittance values are integrated over the wavelength range [a,b]. This range is divided into n equal subintervals of length h by points $\{X_o, X_1, \ldots, X_n\}$ where $X_i = a + (i \times h)$. In the present disclosure, the Rectangular Rule is used to compute the transmittance data. An interpolating function is used to approximate the integrand $f$ in each subinterval. The sum of integrals of this function provides an approximation of the integral:

$$I = \int_a^b f(X)dX$$

In the case of the Rectangular Rule, the constant value $f(X_i)$ is used as an approximation of $f(X)$ on $[X_{i-1}, X_i]$. This yields a step-function approximation of $f(X)$ on $[a,b]$, and the numerical integration formula:

$$I = \sum_{i=1}^{n} f(X_i) \times h$$

Tables I and II illustrate examples of glass compositions at a 3.9 mm (0.154 in.) reference thickness which embody the principles of the present invention to varying degrees only the colorant portions of the examples are listed in the table below, $Fe_2O_3$ being total iron, including that present as FeO. The information provided for Examples 1-14 in Table I, is based on actual glass melts. The information for Examples 15-30 in Table II is based on a computer model that generates theoretical spectral properties based on glass compositions.

of a more neutral application. Examples 11 and 12 are considered preferred embodiment of a more blue-gray application. In addition, Examples 10, 13 and 14 are considered preferred embodiments of a more green-gray application.

The basic batch mixture for the examples comprises:

| Constituent | Ex. 1-12, 15-20 | Ex. 13, 14, 21-30 |
|---|---|---|
| Sand | 1000 parts by wt. | 1000 parts by wt. |
| Soda Ash | 475 | 323 |
| Limestone | 100 | 84 |
| Dolomite | 245 | 244 |
| Nepheline Syenite | 215 | — |
| Graphite | 0.95 | — | with rouge, $Co_3O_4$ and metallic Se being added as required for each example.

The base glass composition for the examples comprises:

| | Ex. 1-12, 15-20 | Ex. 13, 14, 21-30 |
|---|---|---|
| $SiO_2$ | 66.3% by weight | 72.3% by weight |

TABLE 1

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $Fe_2O_3$ wt. % | 1.11 | 1.686 | 1.423 | 1.31 | 1.12 | 1.54 | 1.07 | 1.14 | 1.66 | 1.18 | 1.14 | 1.178 | 1.42 | 1.367 |
| FeO wt. % | 0.374 | 0.328 | 0.264 | 0.418 | 0.388 | 0.242 | 0.336 | 0.446 | 0.23 | 0.37 | 0.36 | 0.38 | 0.35 | 0.354 |
| CoO wt. % | 0.0145 | 0.0223 | 0.0214 | 0.0167 | 0.0140 | 0.0213 | 0.0152 | 0.0129 | 0.0217 | 0.0160 | 0.0127 | 0.0112 | 0.0212 | 0.0212 |
| Se wt. % | 0.0023 | 0.0030 | 0.0030 | 0.0027 | 0.0019 | 0.0040 | 0.0013 | 0.0013 | 0.0046 | 0.0023 | 0.0008 | 0.0010 | 0.0028 | 0.0028 |
| Redox | 0.34 | 0.194 | 0.186 | 0.319 | 0.35 | 0.157 | 0.314 | 0.41 | 0.139 | 0.317 | 0.32 | 0.32 | 0.246 | 0.259 |
| $LT_A$ | 22.72 | 13.87 | 18.49 | 17.52 | 24.07 | 15.62 | 28.32 | 26.87 | 14.8 | 21.9 | 32.67 | 32.65 | 17.9 | 17.62 |
| $LT_C$ | 22.88 | 13.96 | 18.72 | 17.62 | 24.51 | 15.4 | 29.46 | 28.05 | 14.46 | 22.0 | 34.29 | 33.85 | 18.0 | 17.70 |
| TSIR | 8.70 | 8.96 | 14.11 | 6.21 | 7.99 | 16.26 | 19.79 | 5.05 | 19.29 | 8.7 | 8.62 | 8.08 | 11.0 | 10.83 |
| TSUV | 13.21 | 4.55 | 8.07 | 8.43 | 14.30 | 4.67 | 16.74 | 18.69 | 2.84 | 11.5 | 17.9 | 15.93 | 7.5 | 7.90 |
| TSET | 11.77 | 11.93 | 17.29 | 11.77 | 16.06 | 16.73 | 19.51 | 15.84 | 17.8 | 15.4 | 20.9 | 20.03 | 15.3 | 15.06 |
| DW nm | 530.32 | 552.59 | 488.29 | 556.04 | 491.56 | 576.12 | 485.99 | 485.95 | 576.76 | 556.0 | 485.81 | 90.13 | 536.9 | 547.4 |
| Pe % | 1.24 | 2.93 | 3.25 | 3.51 | 3.88 | 8.93 | 10.86 | 11.8 | 14.49 | 4.0 | 13.26 | 8.01 | 1.38 | 1.6 |

TABLE II

| | 15 | 16 | 17 | 18 | 19 | 20 | 21 | 22 |
|---|---|---|---|---|---|---|---|---|
| $Fe_2O_3$ wt. % | 1.10 | 1.4 | 1.65 | 2.1 | 1.06 | 1.10 | 1.42 | 1.50 |
| FeO wt. % | 0.32 | 0.38 | 0.36 | 0.36 | 0.339 | 0.352 | 0.352 | 0.372 |
| CoO wt. % | 0.0115 | 0.0169 | 0.0185 | 0.0208 | 0.0123 | 0.0127 | 0.0193 | 0.0190 |
| Se wt. % | 0.00098 | 0.0023 | 0.0025 | 0.0025 | 0.00103 | 0.0011 | 0.00236 | 0.0023 |
| Redox | 0.32 | 0.27 | 00.22 | 0.17 | 0.32 | 0.32 | 0.248 | 0.248 |
| $LT_A$ | 33.2 | 22.3 | 221.7 | 1.3 | 32.6 | 31.5 | 20.4 | 20.3 |
| $LT_C$ | 34.2 | 22.5 | 222.0 | 1.9 | 33.5 | 32.4 | 20.6 | 20.6 |
| TSIR | 9.0 | 9.0 | 9.8 | 9.7 | 9.0 | 9.0 | 11.3 | 10.2 |
| TSUV | 17.3 | 7.8 | 5.5 | 3.2 | 17.4 | 16.6 | 7.0 | 6.5 |
| TSET | 20.8 | 15.5 | 15.6 | 5.3 | 21.0 | 20.0 | 16.2 | 15.5 |
| DW nm | 488.65 | 556.45 | 352.7 | 2.8 | 87.7 | 488.6 | 525 | 527 |
| Pe % | 7.4 | 4.1 | 5.2 | 5.1 | 7.4 | 6.8 | 1.6 | 2.0 |

| | 23 | 24 | 25 | 26 | 27 | 28 | 29 | 30 |
|---|---|---|---|---|---|---|---|---|
| $Fe_2O_3$ wt. % | 1.60 | 1.70 | 1.70 | 1.70 | 1.80 | 1.90 | 2.00 | 2.10 |
| FeO wt. % | 0.397 | 0.422 | 0.442 | 0.391 | 0.446 | 0.471 | 0.496 | 0.521 |
| CoO wt. % | 0.0184 | 0.0179 | 0.0185 | 0.0199 | 0.0175 | 0.0172 | 0.0168 | 0.0165 |
| Se wt. % | 0.00217 | 0.00206 | 0.00227 | 0.00218 | 0.00198 | 0.0019 | 0.00182 | 0.00173 |
| Redox | 0.248 | 0.248 | 0.26 | 0.23 | 0.248 | 0.248 | 0.248 | 0.248 |
| $LT_A$ | 20.7 | 20.9 | 19.4 | 19.4 | 20.9 | 20.8 | 20.8 | 20.8 |
| $LT_C$ | 21.0 | 21.3 | 19.8 | 19.7 | 21.3 | 21.4 | 21.4 | 21.5 |
| TSIR | 8.9 | 7.8 | 7.0 | 9.2 | 6.9 | 6.0 | 5.3 | 4.7 |
| TSUV | 6.0 | 5.6 | 5.5 | 5.1 | 5.1 | 4.7 | 4.3 | 3.9 |
| TSET | 14.8 | 14.1 | 13.0 | 14.4 | 13.5 | 12.9 | 12.3 | 11.9 |
| DW nm | 525 | 525 | 525 | 526 | 526 | 525 | 526 | 525 |
| Pe % | 2.5 | 3.0 | 2.8 | 2.7 | 3.5 | 3.9 | 4.4 | 4.8 |

Not all of the examples are as blue-gray in color as would be desired as indicated by the dominant wavelengths (DW), nor as neutral in appearance as would be desired as indicated by elevated excitation purities (Pe). Example 5 is considered to be a preferred embodiment

| $Na_2O$ | 17.8 | 13.65 |
|---|---|---|
| CaO | 7.9 | 8.78 |
| MgO | 3.1 | 3.85 |

|  | Ex. 1-12, 15-20 | Ex. 13, 14, 21-30 |
|---|---|---|
| $Al_2O_3$ | 3.1 | 0.14 |

Another characteristic of most mass-produced glass is the presence of traces of melting and refining aids such as sulfur, analyzed in the glass as $SO_3$, or fluorine or chlorine. Small amounts of these melting and refining aids, usually less than 0.3% by weight, may be present in the glass compositions of the present invention without effect on the properties. Much lower concentrations are present in the glass product if the process disclosed in U.S. Pat. No. 4,792,536 is employed to produce the glass, usually less than 0.01 percent by weight $SO_3$.

Glass made by the float process typically ranges from about 2 millimeters to 10 millimeters in thickness. For the vehicle glazing applications of the invention, it is preferred that the transmittance properties be attained within the thickness range of 3 to 6 millimeters.

The product glass of the present invention may advantageously be provided with a luminous reflective coating to enhance the privacy characteristics. For example, luminous transmittance can be lowered to about 20 percent by applying a reflective coating to one surface of a sheet of the glass. Any coating that reduces transmittance and is suitable for application onto glass surfaces may be used. Examples of suitable coatings include a mixture of the oxides of cobalt, iron, and chromium, produced pyrolytically from acetylacetonates of the metals in accordance with the process disclosed in U.S. Pat. No. 3,660,061 (Donley et al.), the disclosure of which is hereby incorporated by reference. Relatively water-insoluble coating reactants, such as acetylacetonates, may be physically suspended in an aqueous medium by continuous mixing as disclosed in U.S. Pat. No. 4,719,126 to Henery. Alternatively, such reactants are chemically suspended in an aqueous medium by utilizing very fine micron-sized particles of coating reactants in combination with a chemical wetting agent as disclosed in U.S. Pat. No. 4,719,127 to Greenberg. Thereby, concentrations as high or higher than those obtainable in organic solvents may be achieved in an aqueous suspension. The resulting aqueous suspension may be applied by conventional means, typically spraying, to a substrate to be coated, particularly a hot glass surface, preferably a float glass ribbon. Although acetylacetonates are the preferred coating reactants in accordance with the present invention, various other organometallic coating reactants may also be employed, as well as relatively water-insoluble compounds in general.

The aqueous suspension is preferably delivered by means of conventional pyrolytic spray equipment to the surface of a hot float glass ribbon of a low transmittance glass Composition. The coating reactants pyrolyze to form a metal oxide film which, in combination with the low transmittance glass substrate produce a reflective, low transmittance, heat-absorbing transparency particularly suitable for use as privacy glazing in vehicles. A reflective coating of this type not only reduces luminous transmittance, but also substantially reduces ultraviolet transmittance.

While the glass substrate itself, at a reference thickness of 3.9 millimeters, preferably has a luminous transmittance less than 35 percent, total solar energy transmittance less than 22 percent and total solar infrared transmittance less than 20 percent, further transmittance reductions are preferably provided by a metal oxide coating. Preferred metal oxide coatings include titanium dioxide and mixed metal oxides of cobalt, iron and chromium. The metal oxide film is preferably deposited by pyrolysis to a thickness which reduces the luminous transmittance of the article to about 25 percent. The coated article preferably has a luminous reflectance not greater than 25 percent from the coated surface and not greater than 8 percent, preferably 5 to 6 percent, from the uncoated surface. Since a titanium oxide coating is typically more reflective and less absorbing than the mixed metal oxide coating, a thinner titanium oxide coating may be preferably combined with the most absorbing, lowest transmittance glass substrates, while a thicker mixed metal oxide coating may be preferred in combination with less absorbing glass substrates.

Since the glass composition of the present invention is particularly adapted to reduce infrared transmittance, the combination of the glass with a coating that reduces luminous and/or ultraviolet transmittance yields a product that is particularly capable of reduced total solar energy transmittance. However, it should be noted that compositions such as Examples 10, 13 and 14 provide good solar performance without the use of a coating. Because of the low transmittance provided by the glass composition of the present invention, smaller coating thicknesses are needed compared to using a more conventional tinted glass as the substrate. For example, a coating of $TiO_2$ from $TiO(C_5H_7O_2)_2$ may be sufficient at a thickness of 270 Ångstroms. In another example, a mixed metal oxide (spinel) coating of 70 weight percent cobalt, 17 weight percent iron, and 13 weight percent chromium (percentages based on metallic state) produced from a solution of 63 weight percent $Co(C_5H_7O_2)_3$, 16 weight percent $Fe(C_5H_7O_2)_3$, and 21 weight percent $Cr(C_5H_7O_2)_3$ is provided with a thickness of 350 Ångstroms.

Another advantage of the glass composition of the present invention as a substrate for a coated product is that the glass absorbs a portion of the radiation not reflected by the coating. Also, the smaller thickness of coating permitted by the low transmittance substrate results in less reflectance from the coating itself. Reflectance no greater than 25 percent from the coated side is considered a maximum for purposes of this aspect of the invention. As a result, particularly when the coated side of the glass is placed on the inside of a vehicle, there is less of a mirror-like appearance from the outside, which is considered more aesthetically pleasing. The combination of the glass of the present invention and the coating examples set forth above can yield reflectance from the uncoated side of the glass lower than ten percent, and as low as six percent or less in preferred examples as follows:

EXAMPLE 31

An aqueous suspension is prepared by blending 400 grams of cobaltic acetylacetonate, 116 grams of ferric acetylacetonate and 136 grams of chromic acetylacetonate, and adding the mixture with vigorous agitation to 4 liters of water. The aqueous suspension thus formed is continuously mixed and recirculated, and is ultimately delivered by means of spray guns to the surface of a glass sheet which is at a temperature of about 1100° F. The organometallic coating reactants pyrolyze to form a mixed metal oxide film comparable to the films formed from organic solutions of the same reactants as taught in U.S. Pat. No. 3,660,061, the disclosure of which is incorporated herein by reference. At a preferred coating thickness of about 350 Ångstroms, on a nominally 4 millimeter thick low transmittance gray glass substrate, the coated article has a luminous reflectance not greater than 25 percent from the coated surface and 5 to 6 percent from the uncoated surface, a luminous transmittance not greater than 20 percent, and a total solar energy transmittance not greater than 15 percent.

EXAMPLE 32

An aqueous suspension is prepared by blending 100 grams of cobaltic acetylacetonate, 29 grams of ferric acetylacetonate and 34 grams of chromic acetylacetonate, and adding the mixture with vigorous agitation to 250 milliliters of water. To reduce foaming, the water contains 3 grams of AEROSOL ® RT 70%, a silicone-based anti-foaming agent available from American Cyanamid. The aqueous suspension is continuously mixed and recirculated and delivered by spray gun to a hot glass surface. A metal oxide film is formed having essentially the same properties as the coating of Example 30.

EXAMPLE 33

An aqueous suspension is prepared as in the previous example except that the coating reactant is titanyl acetylacetonate. A titanium oxide coating approximately 270 Angstroms thick is pyrolytically deposited on a low transmittance gray glass composition as in the previous examples. Since the titanium oxide coating is less absorbing than the mixed metal oxide coating of the previous examples, a darker gray substrate, with lower luminous transmittance, is coated with titanium oxide to produce the desired properties of less than 25 percent luminous transmittance and less than 15 percent total solar energy transmittance.

The above examples are offered to illustrate the present invention. Various other coating reactants, wetting agents, concentrations, additives, substrates, and temperatures may be used to form a wide variety of combinations of reflective coatings on a wide variety of low transmittance glass substrates particularly suited for use as privacy glazing in vehicles.

Other variations as are known to those of skill in the art may be resorted to without departing from the scope of the invention as defined by the claims that follow.

We claim:

1. A neutral gray colored glass composition having a base glass portion comprising:

| | |
|---|---|
| SiO$_2$ | 66–75 percent by weight |
| Na$_2$O | 10–20 |
| CaO | 5–15 |
| MgO | 0–5 |
| Al$_2$O$_3$ | 0–5 |
| K$_2$O | 0–5 | and a colorant portion consisting essentially of:

| | |
|---|---|
| Fe$_2$O$_3$ (total iron) | greater than 1.00 and up to 1.7 percent by weight |
| FeO | at least 0.27 |
| Se | 0.001 up to but less than 0.005 |
| CoO | 0.01–0.02 | the glass having a luminous transmittance of no more than 32 percent, and a total solar infrared transmittance of less than 15 percent at a thickness of 3.9 millimeters.

2. The composition of claim 1 wherein the colorant portion includes greater than 1.0 to 1.3 percent by weight total iron expressed as Fe$_2$O$_3$.

3. The composition of claim 1 wherein the FeO concentration is at least 0.30 weight percent.

4. The composition of claim 1 wherein the FeO concentration is at least 0.35 weight percent.

5. The composition of claim 1 wherein the colorant portion is selected so as to yield total solar infrared transmittance less than 13 percent at 3.9 millimeters thickness.

6. The composition of claim 1 wherein the colorant portion is selected so as to yield total solar infrared transmittance less than 10 percent at 3.9 millimeters thickness.

7. The composition of claim 1 wherein the color of the glass is characterized by dominant wavelengths in the range of 485 to 510 nanometers.

8. The composition of claim 7 wherein the color of the glass is characterized by an excitation purity of no higher than 15%.

9. The glass composition of claim 1 wherein the colorant portion is selected so as to yield a total solar energy transmittance of less than 25% at 3.9 mm thickness.

10. The composition as in claim 1 wherein said colorant portion includes 1.15–1.45 wt. % Fe$_2$O$_3$, 0.25–0.40 wt. % FeO, 0.19–0.23 wt. % CoO, and 0.002–0.0035 wt. % Se, and further wherein said composition has a luminous transmittance of no greater than 25%, a total solar infrared transmittance of no greater than 15% and a total solar energy transmittance of no greater than 25% at 3.9 mm thickness.

11. The composition as in claim 10 wherein said colorant portion includes 1.18–1.26 wt. % Fe$_2$O$_3$, 0.28–0.34 wt. % FeO, 0.195–0.215 wt. % CoO, and 0.0022–0.0031 wt. % Se, and further wherein said composition has a luminous transmittance of no greater than 21%, a total solar infrared transmittance of no greater than 12% and a total solar energy transmittance of no greater than 20% at 3.9 mm thickness.

12. An article of manufacture comprising a glass sheet having a base glass portion comprising:

| | |
|---|---|
| SiO$_2$ | 66–75 percent by weight |
| Na$_2$O | 10–20 |
| CaO | 5–15 |
| MgO | 0–5 |
| Al$_2$O$_3$ | 0–5 |
| K$_2$O | 0–5 | and a colorant portion consisting essentially of:

| | |
|---|---|
| Fe$_2$O$_3$ (total iron) | greater than 1.00 and up to 1.7 percent by weight |
| FeO | at least 0.27 |
| Se | 0.001 up to but less than 0.005 |
| CoO | 0.01–0.02 | the glass having a luminous transmittance of no more than 32 percent, and total solar infrared transmittance less than 15 percent at a thickness of 3.9 millimeters.

13. The article of claim 12 wherein the sheet has a thickness of 2 to 10 millimeters.

14. The article of claim 12 wherein the sheet has a thickness of 3 to 6 millimeters.

15. The article of claim 12 wherein a surface portion of the sheet includes at least 0.05 percent by weight $SnO_2$.

16. The article of claim 12 wherein the luminous transmittance is less than 30 percent at a thickness of 3.9 millimeters.

17. The article of claim 12 wherein the colorant portion includes greater than 1.0 to 1.3 percent by weight total iron expressed as $Fe_2O_3$.

18. The article of claim 12 wherein the FeO concentration is at least 0.30 weight percent.

19. The article of claim 12 wherein the FeO concentration is at least 0.35 weight percent.

20. The article of claim 12 wherein the colorant portion is selected so as to yield total solar infrared transmittance less than 13 percent at 3.9 millimeters thickness.

21. The article of claim 12 wherein the colorant portion is selected so as to yield total solar infrared transmittance less than 10 percent at 3.9 millimeters thickness.

22. The article of claim 12 wherein the color of the glass is characterized by dominant wavelengths in the range of 485 to 510 nanometers.

23. The article of claim 22 wherein the color of the glass is characterized by an excitation purity of no higher than 15%.

24. The article of claim 12 wherein the colorant portion is selected so as to yield a total solar energy transmittance of less than 25% at 3.9 mm thickness.

25. A neutral gray colored glass composition having a base glass portion comprising:

| | |
|---|---|
| $SiO_2$ | 66–75 percent by weight |
| $Na_2O$ | 10–20 |
| CaO | 5–15 |
| MgO | 0–5 |
| $Al_2O_3$ | 0–5 |
| $K_2O$ | 0–5 | and a colorant portion consisting essentially of:

| | |
|---|---|
| $Fe_2O_3$ (total iron) | greater than 1.00 and up to 2.2 percent by weight |
| FeO | at least 0.20 |
| Se | 0.0005 up to but less than 0.005 |
| CoO | 0.010–0.030 | the glass having a luminous transmittance of no more than 35 percent, and a total solar infrared transmittance of less than 20 percent at a thickness of 3.9 millimeters.

26. The composition of claim 25 wherein the colorant portion includes greater than 1.0 to 1.7 percent by weight total iron expressed as $Fe_2O_3$.

27. The composition of claim 25 wherein the FeO concentration is at least 0.27 weight percent.

28. The composition of claim 25 wherein the FeO concentration is between 0.27 to 0.50 weight percent.

29. The composition of claim 25 wherein the colorant portion is selected so as to yield total solar infrared transmittance less than 13 percent at 3.9 millimeters thickness.

30. The composition of claim 25 wherein the color of the glass is characterized by dominant wavelengths in the range of 485 to 580 nanometers.

31. The composition of claim 30 wherein the color of the glass is characterized by an excitation purity of no higher than 15%.

32. The glass composition of claim 25 wherein the colorant portion is selected so as to yield a total solar energy transmittance of less than 25% at 3.9 mm thickness.

33. The article as in claim 12 wherein said colorant portion includes 1.15–1.45 wt. % $Fe_2O_3$, 0.25–0.40 wt. % FeO, 0.19–0.23 wt. % CoO, and 0.002–0.0035 wt. % Se, and further wherein said glass has a luminous transmittance of no greater than 25%, a total solar infrared transmittance of no greater than 15% and a total solar energy transmittance of no greater than 25% at 3.9 mm thickness.

34. The article as in claim 33 wherein said colorant portion includes 1.18–1.26 wt. % $Fe_2O_3$, 0.28–0.34 wt. % FeO, 0.195–0.215 wt. % CoO, and 0.0022–0.0031 wt. % Se, and further wherein said glass has a luminous transmittance of no greater than 21%, a total solar infrared transmittance of no greater than 12% and a total solar energy transmittance of no greater than 20% at 3.9 mm thickness.

35. An article of manufacture comprising a glass sheet having a base glass portion comprising:

| | |
|---|---|
| $SiO_2$ | 66–75 percent by weight |
| $Na_2O$ | 10–20 |
| CaO | 5–15 |
| MgO | 0–5 |
| $Al_2O_3$ | 0–5 |
| $K_2O$ | 0–5 | and a colorant portion consisting essentially of:

| | |
|---|---|
| $Fe_2O_3$ (total iron) | greater than 1.00 and up to 2.2 percent by weight |
| FeO | at least 0.20 |
| Se | 0.0005 up to but less than 0.005 |
| CoO | 0.010–0.030 | the glass having a luminous transmittance of no more than 35 percent, and total solar infrared transmittance less than 20 percent at a thickness of 3.9 millimeters.

36. The article of claim 35 wherein the sheet has a thickness of 2 to 10 millimeters.

37. The article of claim 35 wherein a surface portion of the sheet includes at least 0.05 percent by weight $SnO_2$.

38. The article of claim 35 wherein the luminous transmittance is less than 30 percent at a thickness of 3.9 millimeters.

39. The article of claim 35 wherein the colorant portion includes greater than 1.0 to 1.7 percent by weight total iron expressed as $Fe_2O_3$.

40. The article of claim 35 wherein the FeO concentration is at least 0.27 weight percent.

41. The article of claim 35 wherein the FeO concentration is between 0.28 to 0.50 weight percent.

42. The article of claim 41 wherein the $Fe_2O_3$ concentration is from greater than 1.0 to 1.2 weight percent.

43. The article of claim 41 wherein the $Fe_2O_3$ concentration is from 1.3 to 1.7 weight percent.

44. The article of claim 35 wherein the colorant portion is selected so as to yield total solar infrared transmittance less than 13 percent at 3.9 millimeters thickness.

45. The article of claim 35 wherein the color of the glass is characterized by dominant wavelengths in the range of 485 to 580 nanometers.

46. The article of claim 45 wherein the color of the glass is characterized by an excitation purity of no higher than 15%.

47. The article of claim 35 wherein the colorant portion is selected so as to yield a total solar energy transmittance of less than 25% at 3.9 mm thickness.

* * * * *